US005316197A

United States Patent [19]

Tobler et al.

[11] Patent Number: 5,316,197

[45] Date of Patent: May 31, 1994

[54] FEEDER FOR ADDING FIBROUS MATERIAL TO A CONVEYOR HAVING CONCRETE INGREDIENTS

[75] Inventors: Hugh J. Tobler; Larry G. Lepper, both of Indianola, Iowa; Robert B. Sawdon, Williamston, Mich.

[73] Assignee: Cemen Tech, Inc., Indianola, Iowa

[21] Appl. No.: 983,887

[22] Filed: Dec. 1, 1992

[51] Int. Cl.$^5$ .............................................. G01F 11/20

[52] U.S. Cl. .................................... 222/281; 118/308; 222/252

[58] Field of Search ............... 222/280, 281, 252, 256; 239/652, 658, 668, 682; 118/308

[56] References Cited

U.S. PATENT DOCUMENTS

| | | | |
|---|---|---|---|
| 771,137 | 9/1904 | Frerking | 222/281 |
| 2,485,226 | 10/1949 | Weeden | 222/280 X |
| 3,494,511 | 2/1970 | Daignas | 222/281 |
| 3,785,527 | 1/1974 | Brand | 222/280 X |
| 3,873,032 | 3/1975 | Jellis, Jr. | 239/658 |
| 4,145,990 | 3/1979 | Hochandel et al. | 118/308 X |
| 4,478,869 | 10/1984 | Brady et al. | 118/308 X |
| 4,513,893 | 4/1985 | Baba | 222/281 |
| 4,530,383 | 7/1985 | Lehtinen et al. | 222/280 X |
| 4,655,161 | 4/1987 | Thompson | 118/308 X |

FOREIGN PATENT DOCUMENTS

| | | | |
|---|---|---|---|
| 1186381 | 1/1965 | Fed. Rep. of Germany | 222/252 |
| 1015346 | 12/1965 | United Kingdom | 222/252 |

*Primary Examiner*—Kevin P. Shaver
*Attorney, Agent, or Firm*—Zarley, McKee, Thomte, Voorhees, & Sease

[57] ABSTRACT

The present invention is an apparatus for introducing fibrous material into a continuous flow of concrete. Fibrous material is pushed through an aperture located in the bottom of a container. As the fiber falls from the aperture, it is agitated and spread evenly onto the mixture of concrete. The resulting distribution of fiber within the concrete mixture increases the strength of the concrete while preventing undo grouping of the fibers.

14 Claims, 2 Drawing Sheets

FEEDER FOR ADDING FIBROUS MATERIAL TO A CONVEYOR HAVING CONCRETE INGREDIENTS

BACKGROUND OF THE INVENTION

Construction concrete, particularly that used for roads and structures, has long been the mainstay of the American infrastructure. However, the use to which it is put is limited by the concretes strength. It has been the goal for many years to strengthen cement through the use of certain additives and alternative mixtures. One approach to strengthening concrete consist of adding fibers, such as those made of fiberglass, nylon ®, polypopylene, or other fibrous materials to the concrete mixture. The addition of these fibers increases the tensile strength of the hardened mixture. It is therefore common to dose a large quantity of concrete with a quantity of these fibers prior to hardening. One of the problems with adding fibers is that they tend to clump together and do not evenly distribute throughout the concrete mixture. There is, therefore, a need for the development of an apparatus which will evenly distribute fibrous material throughout a concrete mixture and insure that the fibers are evenly distributed in the aggregate.

Generally, there are two ways in which concrete is made. The first method is known as the batch method. Simply put, it occurs when an individual creates only one batch of concrete at a time by adding a specified and predetermined amount of ingredients in a mixing caldron. A second common and more economical way is known as the continuous production method. In that process, concrete is continually produced on a series of conveyor belts and mixing machines and transported to its final designation.

This invention has the primary objective of delivering equal and consistent doses of fibrous material onto a continuous concrete production conveyor belt system.

Another object of this invention is to distribute the fibrous material in such a manner as to avoid unnecessary clumping or grouping of the fibers within the aggregate.

SUMMARY OF THE INVENTION

The invention relates to a means and method for introducing fibrous material onto a continuous flow of concrete. The fiber feeder is comprised of a container holding fibrous material. An aperture is located at the bottom of the container through which fibrous material will be forced. A ram or piston pushes the material through the container and out the aperture. As the fibrous material emerges from the aperture, rotating fingers agitate it and cause it to fall out of the opening. The material then falls onto a conveyor and is mixed with the other concrete ingredients.

DETAILED DESCRIPTION OF THE PREFERRED EMBODIMENT

Figure 1:
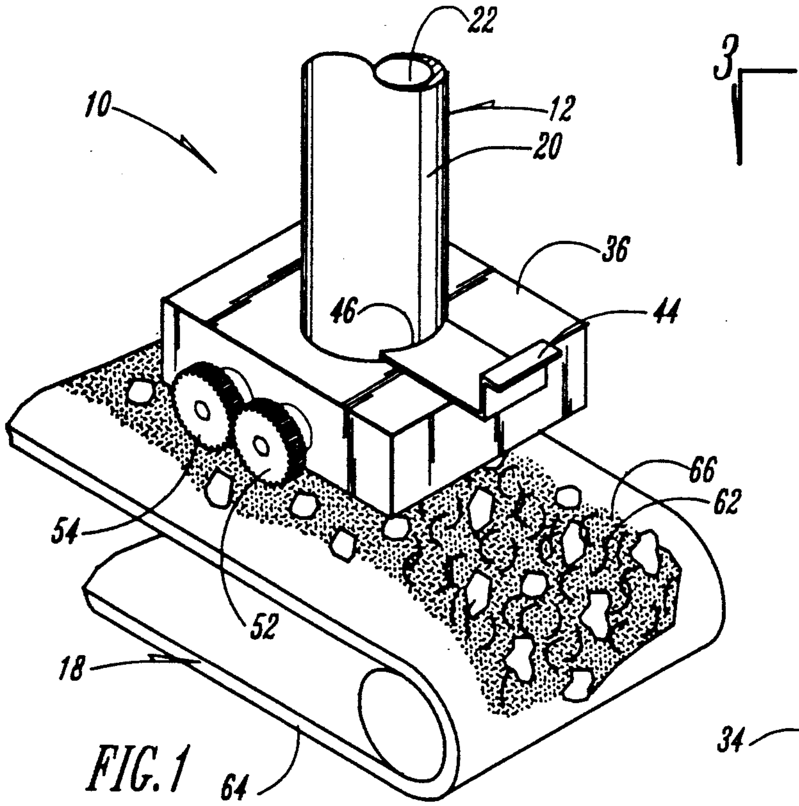
FIG. 1 is a perspective view of the lower portion of the fiber feeder located above a conveyor of concrete mixture.
Figure 2:
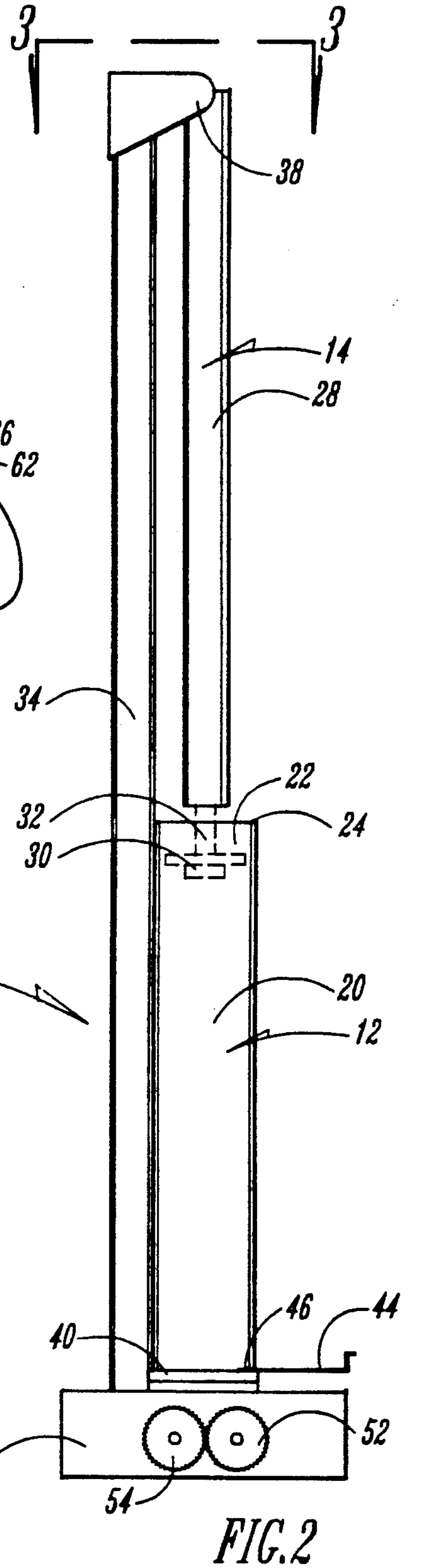
FIG. 2 is a elevational view of the fiber feeder.
Figure 3:
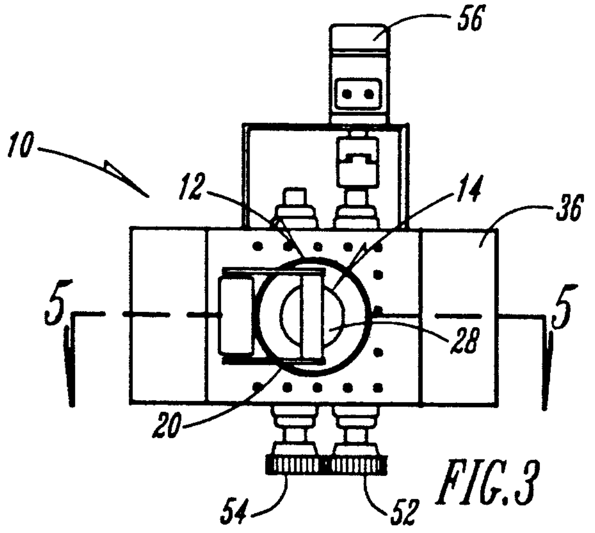
FIG. 3 is a top view taken on line 3—3 of FIG. 2.
Figure 4:
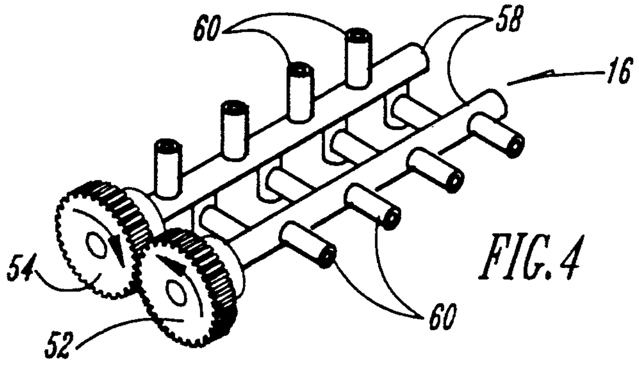
FIG. 4 is a perspective view showing the agitating means of the preferred embodiment.
Figure 5:
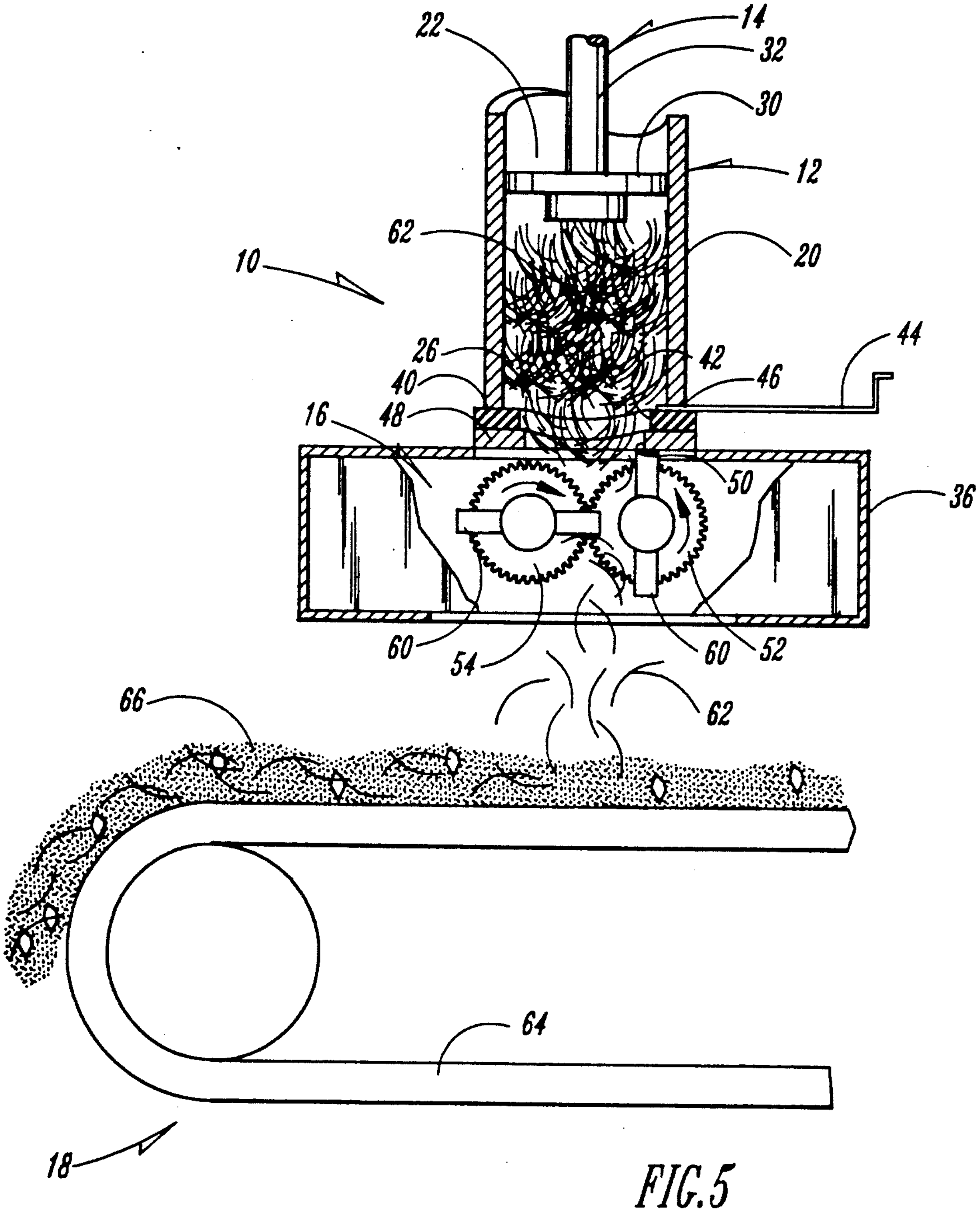
FIG. 5 is a sectional view taken along line 5—5 of FIG. 3.

FIG. 5 shows a sectional view of the general relationship of the component parts of the preferred embodiment of the fiber feeder, referred to generally by the numeral 10. The fiber feeder 10 is comprised of a container 12, an extruding means 14, an agitating means 16, and a conveyor means 18. The container 12 is a cylinder 20 with a bore 22 along its longitudinal axis. The container 12 has apertures 24, 26 at both ends. The top aperture 24 remains open. The bottom aperture 26 is mounted above the agitating means 16.

Extruding means 14 includes a piston 28 that has a plunger 30 on the end of the piston shaft 32. The extruding means 14 is held above the container 12 by a mast 34 mounted on the housing 36 for the agitating means 16. The mast 34 includes a boom 38 to which the extruding means 14 is connected. The piston shaft 32 reciprocates up and down forcing the plunger 30 to move inside the container 12. As the piston shaft 32 and plunger 30 move downward toward the agitating means 16, the plunger 30 forces any material inside the container 12 out of the bottom aperture 26. The piston shaft 32 can be retracted so that the plunger 30 clears the top aperture 24.

A flexible rubber shoe 40 containing an aperture 42 is set at the bottom aperture 26. The bottom aperture 26 and the aperture 42 of the rubber shoe 40 are aligned. A gate 44 is slidably mounted between the rubber shoe 40 and the container 12. A passage 46 allows the gate 44 to slide between the bottom aperture 26 and the aperture 42 of the rubber shoe 40 obstructing the flow of material from the container 12. The rubber shoe 40 is fastened on top of a plate 48, also containing an aperture 50. The apertures 26, 42, and 50 of the container 12, the rubber shoe 40, and the plate 48 respectively, are aligned to allow material flow, provided the gate 44 is in an open position.

The housing 36 for the agitating means 16 is secured to the plate 48. Inside the housing 36, the agitating means 16 is positioned adjacent to the aperture 50 in the plate 48. The agitating means 16 includes a drive gear 52 and a rotary gear 54. The gears 52, 54 lie adjacent to each other in the same plane and have a toothed surface. The toothed edge of the drive gear 52 meshes with the tooth part of the rotary gear 54 to transmit motion when the drive gear 52 is turned by the drive means 56. Attached to the gears 52, 54 are elongated shafts 58 containing a plurality of fingers 60 extending perpendicularly from the shaft 58. As the gears 52, 54 rotate, the fingers 60 rake fibrous material 62 that has been forced from the container 12 by the extruding means 14.

As the fibrous material 62 is raked, it falls in a uniform fashion onto a conveyor means 18. The conveyor means 18 includes a moving belt 64 that holds concrete mixture 66.

It can be seen that the fiber feeder 10 accomplishes all the objectives of the present invention. The fiber 62 is distributed evenly within the concrete mixture, thereby strengthening the hardened concrete product. The machinery and method of the present invention permit the continuous addition of fiber onto the concrete mixture in a very efficient manner.

What is claimed is:

1. A fiber feeder and conveyer for introducing fibrous material into a continuous flow of matter comprising:

a container for fibrous materials, said container having an aperture therein;

extruding means for extruding fibrous material through said aperture;

agitating means for raking said fibrous material from said aperture and agitating said fibrous material located adjacent to said aperture; and conveyor means containing ingredients for the production of concrete aligned below said aperture for carrying said fibrous material and other concrete ingredients away.

2. The fiber feeder of claim 1 wherein said container comprises a cylindrical tube.

3. The fiber feeder of claim 1 wherein said extruding means comprises a reciprocating piston.

4. The fiber feeder of claim 1 wherein said agitating means comprises at least one rotating rake, said rake having an elongated shaft and a plurality of fingers extending perpendicular therefrom.

5. The fiber feeder of claim 1 wherein said container is mounted vertically on a plate containing said aperture.

6. The fiber feeder of claim 5 wherein said plate and container are separated by a flexible washer.

7. The fiber feeder of claim 1 wherein said container includes an adjustable gate above said aperture, said gate adapted to open and close thereby retaining said fibrous material.

8. A device for incorporating fibrous material into a mixture, comprising:

(a) container means for containing fibrous material having a first end, a second end and a bore extending there between, said container means further having an aperture located at said second end;

(b) agitating means supported for raking said fibrous material from said aperture and rotational motion adjacent said second end of said container means for agitating said fibrous material;

(c) conveyor means located below said aperture at said second end of said container means for transporting said fibrous material and other concrete ingredients;

(d) extruding means supported for movement with respect to said container means for driving said fibrous material from said first end to said aperture at said second end;

(c) drive means coupled to said extruding means for moving extruding means from said first position to said second position; and (f) power means operatively connected to said agitating means for imparting rotary motion in said agitating means.

9. The device of claim 8 wherein said container means comprises a cylindrical tube.

10. The device of claim 8 wherein said extruding means and said drive means comprises:

(a) plunging means for forcing said fibrous material toward said second end of said container means: and (b) a piston shaft coupled at one end to said plunging means and extending out of said first end of said container means; and (c) a piston connected at a second end of said piston shaft, said piston capable of providing linear motion to said plunging means and forcing said fibrous material toward said second end of said container means.

11. The device of claim 8 wherein said agitating means comprises:

(a) an elongated shaft; and (b) a plurality of agitating elements extending perpendicularly from said elongated shaft.

12. The device of claim 8 wherein said agitating means comprises at a first elongated shaft having a first end and second end and a second elongated shaft having a first end and second end, said elongated shafts having intermeshing gears positioned at said first end of each in such a manner that rotary motion in a first said elongated shafts is transmitted to a second elongated shaft.

13. The device of claim 12 wherein said power means is positioned at said second end of said first elongated shaft.

14. The device of claim 8 further comprising a means for closing said aperture.

* * * * *